(12) United States Patent
Zhao

(10) Patent No.: US 9,354,664 B2
(45) Date of Patent: May 31, 2016

(54) ELECTRONIC DEVICE AND INPUT METHOD

(75) Inventor: Qian Zhao, Beijing (CN)

(73) Assignees: BEIJING LENOVO SOFTWARE LTD., Beijing (CN); LENOVO (BEIJING) CO., LTD., Beijing (CN)

(*) Notice: Subject to any disclaimer, the term of this patent is extended or adjusted under 35 U.S.C. 154(b) by 545 days.

(21) Appl. No.: 13/638,529

(22) PCT Filed: Mar. 29, 2011

(86) PCT No.: PCT/CN2011/072246
§ 371 (c)(1),
(2), (4) Date: Sep. 28, 2012

(87) PCT Pub. No.: WO2011/120419
PCT Pub. Date: Oct. 6, 2011

(65) Prior Publication Data
US 2013/0024590 A1    Jan. 24, 2013

(30) Foreign Application Priority Data
Mar. 31, 2010  (CN) .......................... 2010 1 0138130

(51) Int. Cl.
G06F 13/00    (2006.01)
G06F 1/16     (2006.01)
(Continued)

(52) U.S. Cl.
CPC ............ *G06F 1/1654* (2013.01); *G06F 1/1616* (2013.01); *G06F 1/1626* (2013.01);
(Continued)

(58) Field of Classification Search
CPC ............. G06F 9/00; G06F 9/06; G06F 12/00; G06F 13/00; G06F 15/76
USPC .................................................. 710/100, 300
See application file for complete search history.

(56) References Cited

U.S. PATENT DOCUMENTS

2004/0004810 A1    1/2004  Kim
(Continued)

FOREIGN PATENT DOCUMENTS

CN    1484137    3/2004
CN    1178128    12/2004
(Continued)

OTHER PUBLICATIONS

Beijing Lenovo Software Ltd.; PCT/CN2011/072246 filed Mar. 29, 2011; International Preliminary Report on Patentability; mailed Jul. 7, 2011; Issuance Date Oct. 2, 2012; 6 pages.
(Continued)

*Primary Examiner* — Cheng-Yuan Tseng
(74) *Attorney, Agent, or Firm* — Peter Su; Dentons US LLP

(57) ABSTRACT

An electronic device and an input method are provided. The electronic device comprises a first system and a second system; the first system comprises a first hardware system on which a first Operation System (OS) runs, and the first hardware system comprises a first interface and a second interface; the second system comprises a second hardware system, an input device and a display device, a second OS runs on the second hardware system, and the second hardware system comprises a third interface and a fourth interface; the first interface and the third interface support a first data transmission protocol, and the second interface and the fourth interface support a second data transmission protocol; the electronic device has a first connection state and a second connection state; the first connection state is the state in which the first system is connected to the third interface of the second system through the first interface, the display device is used for displaying the running status of the first OS, the input device is used for generating a first operating instruction, and the first OS is used for responding to the first operating instruction; and the second connection state is the state in which the first system is connected to the fourth interface of the second system through the second interface, the input device is used for generating a second operating instruction which is processed by the second OS and transmitted to the first OS after being processed, and the processed second operating instruction is responded to by the first OS. Because the two parts of the electronic device are combined arbitrarily and the respective skilled functions of the two systems are fully used after being combined, user can take full use of all parts of a detachable computer by applying this technical solution.

10 Claims, 7 Drawing Sheets

(51) Int. Cl.
*G06F 3/14* (2006.01)
*G09G 5/00* (2006.01)

(52) U.S. Cl.
CPC ............ *G06F3/1423* (2013.01); *G06F 3/1454* (2013.01); *G09G 5/006* (2013.01); *G09G 2370/04* (2013.01); *G09G 2370/06* (2013.01); *G09G 2370/22* (2013.01)

(56) References Cited

U.S. PATENT DOCUMENTS

| | | | |
|---|---|---|---|
| 2010/0306501 A1* | 12/2010 | Chang et al. | 712/31 |
| 2011/0113219 A1* | 5/2011 | Golshan et al. | 712/30 |
| 2011/0185009 A1* | 7/2011 | Chang et al. | 709/203 |

FOREIGN PATENT DOCUMENTS

| | | |
|---|---|---|
| CN | 1200338 | 5/2005 |
| CN | 1710512 | 12/2005 |
| GB | 2418270 | 3/2006 |

OTHER PUBLICATIONS

Beijing Lenovo Software Ltd.; PCT/CN2011/072246 filed Mar. 29, 2011; International Search Report; mailed Jul. 7, 2011; 3 pages.
English Translation of International Search Report in PCT/CN2011/072246.
English translation CN1200338C.
English translation of CN1178128C.
Chinese Patent Application No. 201010138130.3, Chinese Patent Office, First Office Action issued on Jul. 2, 2012; 7 pages.
English Text of First Office Action for Chinese Patent Application No. 201010138130.3, Chinese Patent Office, First Office Action issued on Jul. 2, 2012; 6 pages.
Chinese Patent Application No. 201010138130.3, Chinese Patent Office, Second Office Action issued on Feb. 8, 2013; 4 pages.
English Text of Second Office Action for Chinese Patent Application No. 201010138130.3, Chinese Patent Office, Second Office Action issued on Feb. 8, 2013; 3 pages.
English Translation of CN 1484137 A; published on Mar. 24, 2004; 12 pages.
English Abstract of CN 1710512 A; published on Dec. 21, 2005; 1 page.

\* cited by examiner

ELECTRONIC DEVICE AND INPUT METHOD

CROSS REFERENCE TO RELATED APPLICATIONS

This application is a national phase application based on international application number PCT/CN2011/072246, filed Mar. 29, 2011, and claims priority of Chinese Patent Application No. 201010138130.3, filed Mar. 31, 2010, the contents of both of which are incorporated by reference herein in their entireties.

TECHNICAL FIELD

The present invention relates generally to computer technology and particularly relates to an electronic device and input method.

BACKGROUND

A screen-detachable computer comprises two detachable parts: a slate and a base, wherein the slate is an ARM system, and the base an x86 system.

After a screen-detachable computer is disassembled into two parts, the slate can be used independently as a tablet, which comprises a touch panel, a G-sensor and other sensors. When the slate is attached to the base, a complete computer system is constituted and provides normal computer experiences for the user. At this time, the entire computer is controlled by the x86 system of the base.

In the process of achieving the present invention, the inventor has discovered at least the following problem in the related art: as the base and slate are separately used after the detachable computer is disassembled, it is not possible to realize more new functions with their respective features combined, and the nature of the detachable computer is, therefore, not fully exploited.

SUMMARY

The objective of the embodiments of the present invention is to provide an electronic device and input method for fully utilizing the respective parts of a detachable computer.

An electronic device, comprising: a first system, which comprises a first hardware system, wherein a first Operation System (OS) runs on the first hardware system, and the first hardware system comprises a first interface and a second interface; and a second system, which comprises a second hardware system, an input device, and a display device, wherein a second OS runs on the second hardware system, the second hardware system comprises a third interface and a fourth interface, the first interface and the third interface support a first data transmission protocol, and the second interface and the fourth interface support a second data transmission protocol, wherein the electronic device has a first connection state and a second connection state: the first connection state is a state in which the first system is connected to the third interface of the second system through the first interface, the display device is used for displaying the running status of the first OS, the input device is used for generating a first operating instruction, and the first OS is used for responding to the first operating instruction. The second connection state is a state in which the first system is connected to the fourth interface of the second system through the second interface, the input device is used for generating a second operating instruction, the second operating instruction is processed by the second OS and transmitted to the first OS after being processed, and the processed second operating instruction is responded to by the first OS.

In the electronic device, the first hardware system or the second hardware system further comprises: a connection detecting unit, configured for detecting a connection state between the first system and the second system, and generating a state detection result to be transmitted to the second system, according to the current connection state.

In the electronic device, the second hardware system further comprises: a second processing unit, configured for executing the second operating instruction delivered by the second OS; a switching unit, which is connected to the third interface, the second processing unit, and the input device, configured for, analyzing the state detection result after receiving the state detection result, and connecting the input device with the third interface when the electronic device is in the first connection state; and connecting the input device with the second processing unit, when the electronic device is in the second connection state.

In the electronic device, the first system is a base of a detachable computer, and the second system is a slate of the detachable computer, the first connection state is wired connection, and the first interface and the third interface are plug-in or contacting interfaces.

In the electronic device, the first system is a base of a detachable computer, and the second system is a slate of the detachable computer, the second connection state is wireless connection, which is implemented by one of Bluetooth, Wireless Local Area Network (WLAN), and Radio Frequency (RF).

In the electronic device, a second connection state is realized by connecting the first system to the fourth interface of the second system through the second interface, further comprises: the display device is used for displaying the running status of the first OS or the running status of the second OS.

An input method applied to an electronic device, the electronic device comprises: a first system comprising a first hardware system, wherein a first Operation System (OS) runs on the first hardware system, and the first hardware system comprises a first interface and a second interface; and a second system, which comprises a second hardware system, an input device, and a display device, wherein a second OS runs on the second hardware system, the second hardware system comprises a third interface and a fourth interface, the first interface and the third interface support a first data transmission protocol, and the second interface and the fourth interface support a second data transmission protocol, there is a first connection state and a second connection state between the first system and the second system, the first connection state is a state in which the first system is connected to the third interface of the second system through the first interface, and the second connection state is a state in which the first system is connected to the fourth interface of the second system through the second interface, the method comprising: generating an operating instruction by the input device; in the first connection state, displaying the running status of the first OS by the display device, and transmitting a first operating instruction generated by the input device to the first OS so as to be responded to by the first OS; and in the second connection state, a second operating instruction generated by the input device is processed by the second OS, transmitted to the first OS by the second OS after being processed, and responded to by the first OS.

In the method, after the operating instruction is generated by the input device, further comprising: detecting a connection state between the first system and the second system, and generating a state detection result to be transmitted to the second system, according to the detected connection state.

In the method, after the second system receives the state detection result, further comprising: analyzing the state detection result, and: connecting the input device with the third interface, when the electronic device is in the first connection state; and connecting the input device with the second processing unit, when the electronic device is in the second connection state.

In the method, before the operating instruction is generated by the input device, further comprising: detecting whether an interface of the second system is connected with an interface of the first system, and generating a first detection result therefrom; and when the first detection result indicates the two interfaces are connected, transmitting a first notification instruction to the first system and the second system, respectively, indicating the first system is connected with the second system, wherein the electronic device is in a connected state when the first system is connected with the second system.

With the above technical solutions, since the two constituent systems of the electronic device can be arbitrarily combined, the visual and interactive functions of the second system and the powerful computing capability of the first system are fully exploited through combination, enabling the user to realize various functions by taking full advantage of the respective parts of the electronic device.

DETAILED DESCRIPTION

The objectives, technical features, and effects of the present invention will be more apparent by describing the technical solutions of the present invention in detail with reference to the drawings and specific implementations.

Figure 1:
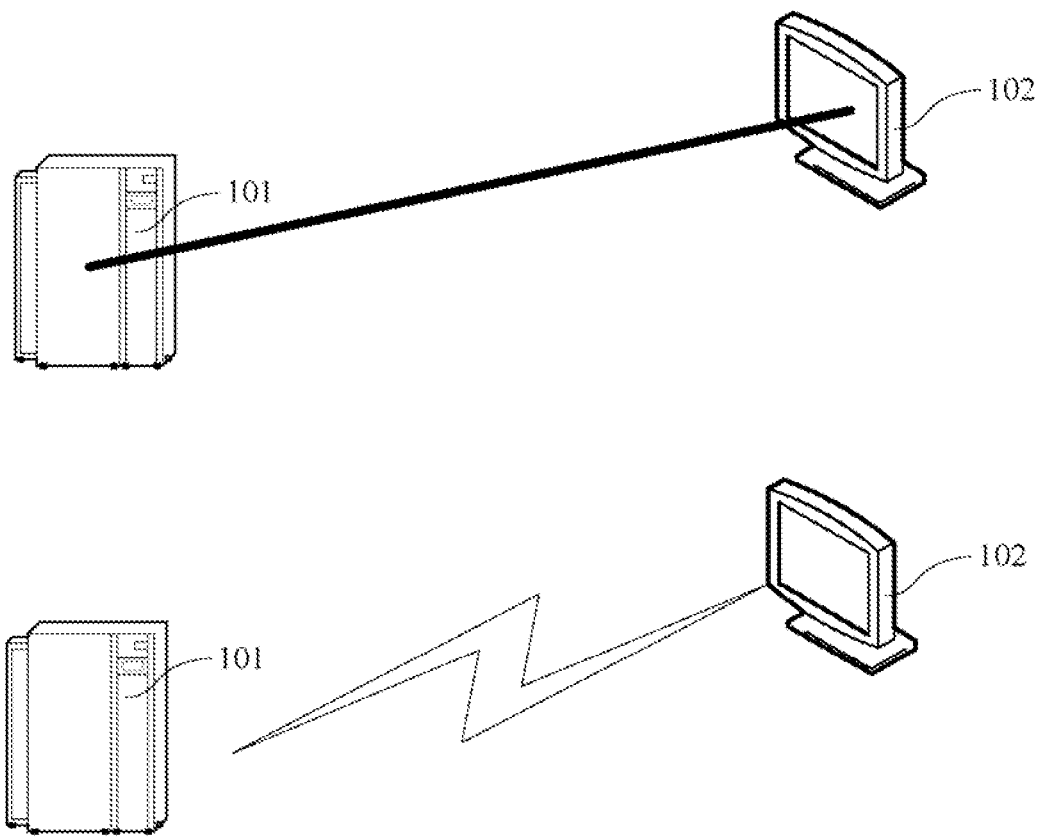
FIG. 1 is a structure diagram of the electronic device according to an embodiment of the present invention.

According to an embodiment of the present invention, an electronic device is provided as shown in FIG. 1, comprising a first system 101, comprising a first hardware system, wherein a first Operation System (OS) 1011 runs on the first hardware system, and the first hardware system comprises a first interface 1012 and a second interface 1013; and a second system 102, which comprises a second hardware system, an input device 1022, and a display device 1023, wherein a second OS 1021 runs on the second hardware system, the second hardware system comprises a third interface 1024 and a fourth interface 1025, the first interface 1012 and the third interface 1024 support a first data transmission protocol, and the second interface 1013 and the fourth interface 1025 support a second data transmission protocol, wherein the electronic device has a first connection state and a second connection state: the first connection state is a state in which the first system 101 is connected to the third interface 1024 of the second system 102 through the first interface 1012, the display device 1023 is used for displaying the running status of the first OS 1011, the input device 1022 is used for generating a first operating instruction, and the first OS 1011 is used for responding to the first operating instruction, the second connection state is a state in which the first system 101 is connected to the fourth interface 1025 of the second system 102 through the second interface 1013, the input device 1022 is used for generating a second operating instruction, the second operating instruction is processed by the second OS 1021, which determines whether to transmit to the first OS 1011 after it has been processed, and the processed second operating instruction is responded to by the first OS 1011.

With the above technical solution, since the two constituent systems of the electronic device can be arbitrarily combined, the visual and interactive functions of the second system 102 and the powerful computing capability of the first system 101 are fully exploited through combination, enabling the user to realize various functions by taking full advantage of the respective parts of the electronic device.

Figure 7:
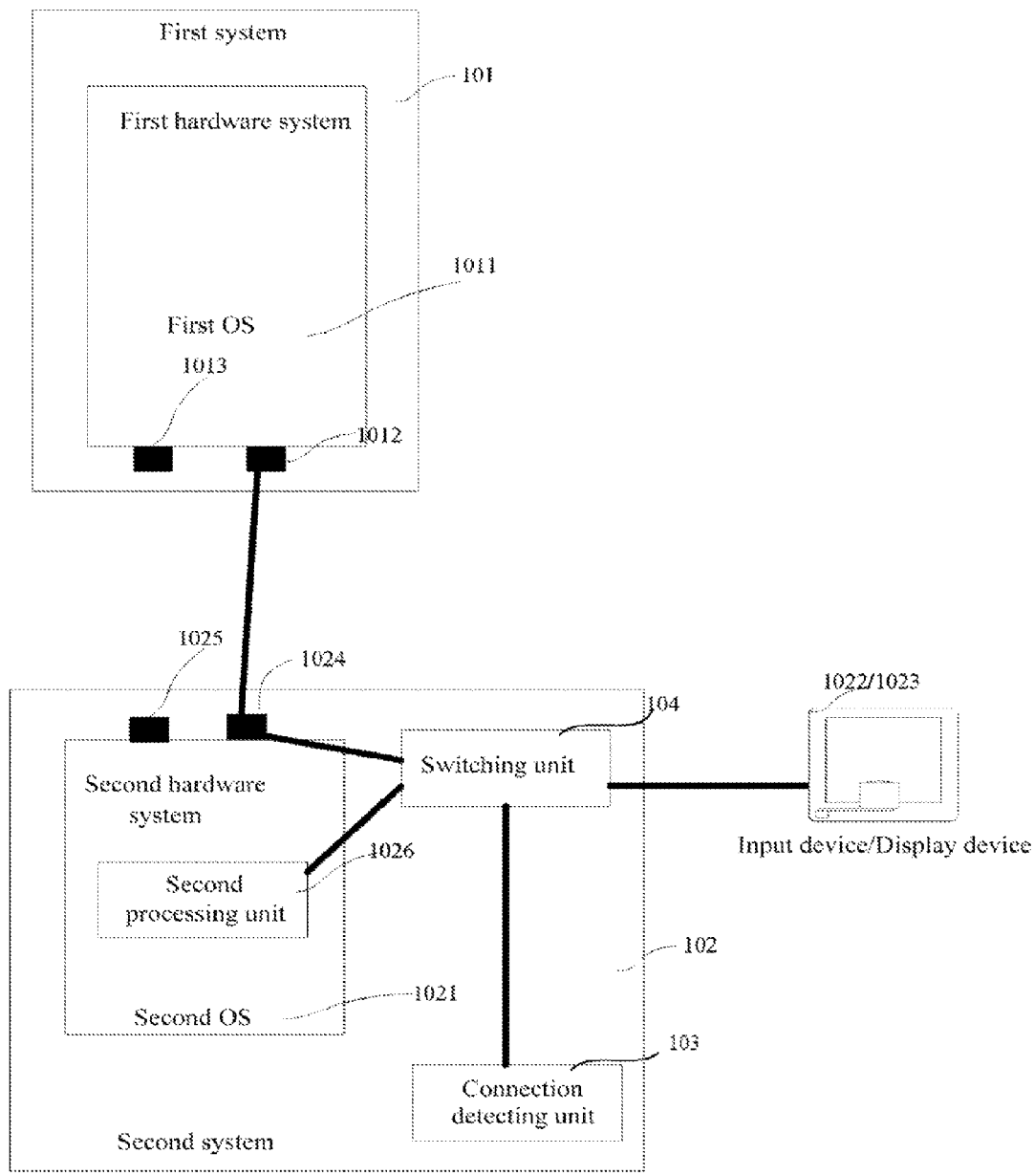
FIG. 7 is a structure diagram of the electronic device with connection detecting function according to an embodiment of the present invention.

As shown in FIG. 7, the first hardware system or the second hardware system further comprises a connection detecting unit 103, configured for detecting a connection state between the first system 101 and the second system 102, and generating a state detection result and transmitting it to the second system 102; a second processing unit 1026, configured for executing the second operating instruction delivered by the second OS 1021; a switching unit 104, which is connected to the third interface 1024, the second processing unit 1026, and the input device 1022, configured for, upon receiving the state detection result, analyzing the state detection result, and: connecting the input device 1022 with the third interface 1024, when the electronic device is in the first connection state; and connecting the input device 1022 with the second processing unit 1026, when the electronic device is in the second connection state.

In the above technical solution, the received operating instruction is processed by the second system respectively according to the detected connection state: the operating instruction is processed directly by the second system and transmitted to the first system, the operating instruction being the second operating instruction; or the operating instruction is transmitted to the first system to be processed directly by the first system, the operating instruction being the first operating instruction. In particular, as the first interface 1012 and the third interface 1024 support the first data transmission protocol, and the second interface 1013 and the fourth interface 1025 support the second data transmission protocol Therefore, when the electronic device is in the first connection state, after the input device 1022 is connected with the third interface 1023 by the switching unit 104, the operating instruction from the input device 1022 is encapsulated in a form complying with the first data transmission protocol, transmitted to the third interface 1024, and delivered to the first system 101 via the first interface 1012 from the third interface 1024.

When the electronic device is in the second connection state, the input device 1022 is connected with the second processing unit 1026 by the switching unit 104. The second operating instruction from the input device 1022 is transmitted to the second processing unit 1026 to be processed. The processed second operating instruction is encapsulated in a form complying with the second data transmission protocol, transmitted to the fourth interface 1025, and delivered to the first system 101 via the second interface 1013 from the fourth interface 1025, to be further processed by the first system 101. Herein, although the second operating instruction processed by the second processing unit 1026 may be different from the second operating instruction before being processed, it is still referred to as "the second operating instruction" for the sake of brevity and to distinguish with the first operating instruction in the first connection state.

Figure 2:
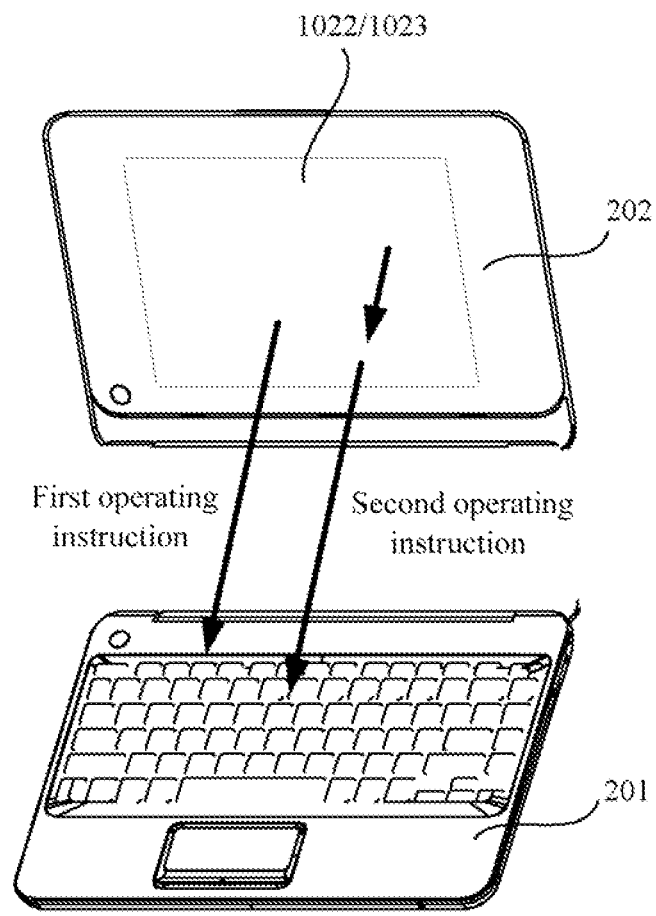
FIG. 2 is a structure diagram of the electronic device with detecting and switching function according to an embodiment of the present invention.

As shown in FIG. 2, as the touch input from the input device 1022 is shared by the first system 101 and the second system 102. When the second system 102 is connected with the first system 101 in the first connection state, the first operating instruction inputted from the input device 1022 is switched to the first system 101. When the second system 102 and the first system 101 are in the first connection state, the input device 1022 is connected into the first system 101 via the connection detecting unit 103 as a USB device. When a user performs a touch operation, the data generated by the input device 1022 is delivered to the first system 101 via a USB channel, that is, the first data transmission protocol is supported. At this time, as the functions of the second system 102 are partly disabled, enabling a standby state of the second system 102, only the input device 1022 and the display device 1023 are required to remain in operating state.

Figure 3:
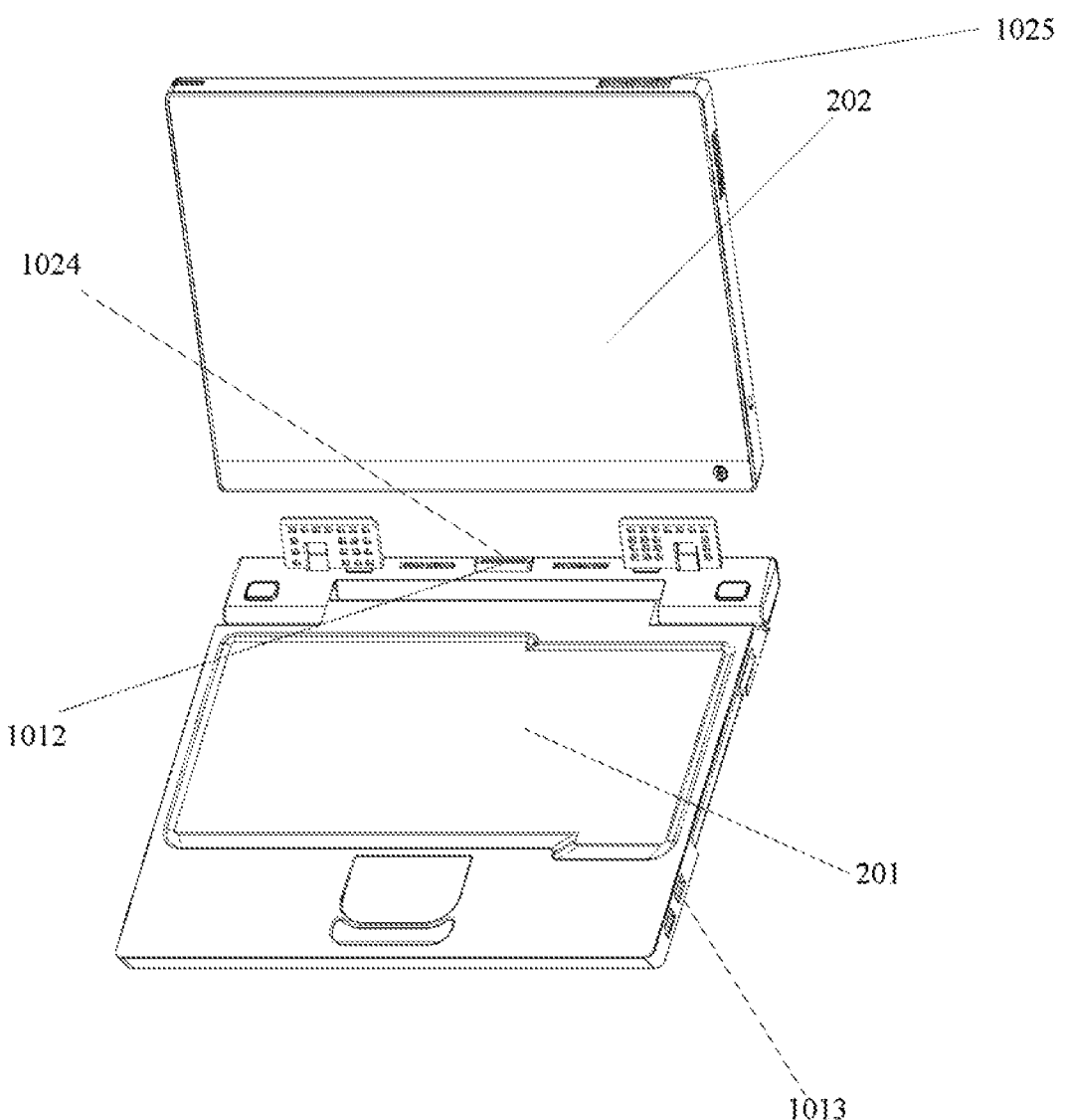
FIG. 3 is a structure diagram of the detachable computer according to an embodiment of the present invention.

As shown in FIG. 3, as the touch input from the input device 1022 is shared by the first system 101 and the second system 102. When the second system 102 is cooperated with the first system 101 in the second connection state, the second operating instruction inputted from the input device 1022 is switched to the second system 102. The input device 1022 is connected into the second system 102 via the connection detecting unit 103 as a USB device. The second system 102 is connected to the first system 101 via a wireless connection such as Bluetooth or WiFi, when a user performs a touch operation, the data generated by the input device 1022 is delivered to the first system 101 via the wireless connection by the second system 102, that is, the second data transmission protocol is supported.

It is to be noted that, the input device 1022 and the second system 102 are separated in FIG. 2. However, in the practical manufacturing process, the input device 1022 is a portion of the second system 102, i.e., fitted in the second system 102. The connection detecting unit 103 may locate in either the first system 101 or the second system 102.

The presented technical solutions will be further described with a detachable computer by way of example to assist those skilled in the art in implementing the present inventive concept. As shown in FIG. 3, the detachable computer comprises two parts: a base 201 and a slate 202, wherein the base 201 corresponds to the first system 101, and the slate 202 corresponds to the second system 102.

The base 201 comprises: a first housing, a first hardware system, and a first OS. The first hardware system is provided in the first housing and comprises at least a first interface and a third interface, the first OS runs on the first hardware system. The first OS is generally a desktop device system such as Windows system, the base 201 is capable of operating independently as a standalone device, operating as a home server, for example, performing downloading tasks, or connecting to a normal display to constitute a general computer.

The slate 202 comprises a second housing, a display device 1023, an input device 1022, a second hardware system, and a second OS. The second hardware system is provided in the second housing and comprises at least a second interface and a fourth interface, the second hardware system being different from the first second hardware system, the second OS runs on the second hardware system. The second OS is generally a Linux system or an embedded system such as WinCE system and Android system. The slate 202 is capable of operating independently as a standalone device, or being used as a tablet touch computer. The processing power of the second hardware system is usually weaker than that of the first hardware system.

Figure 4:
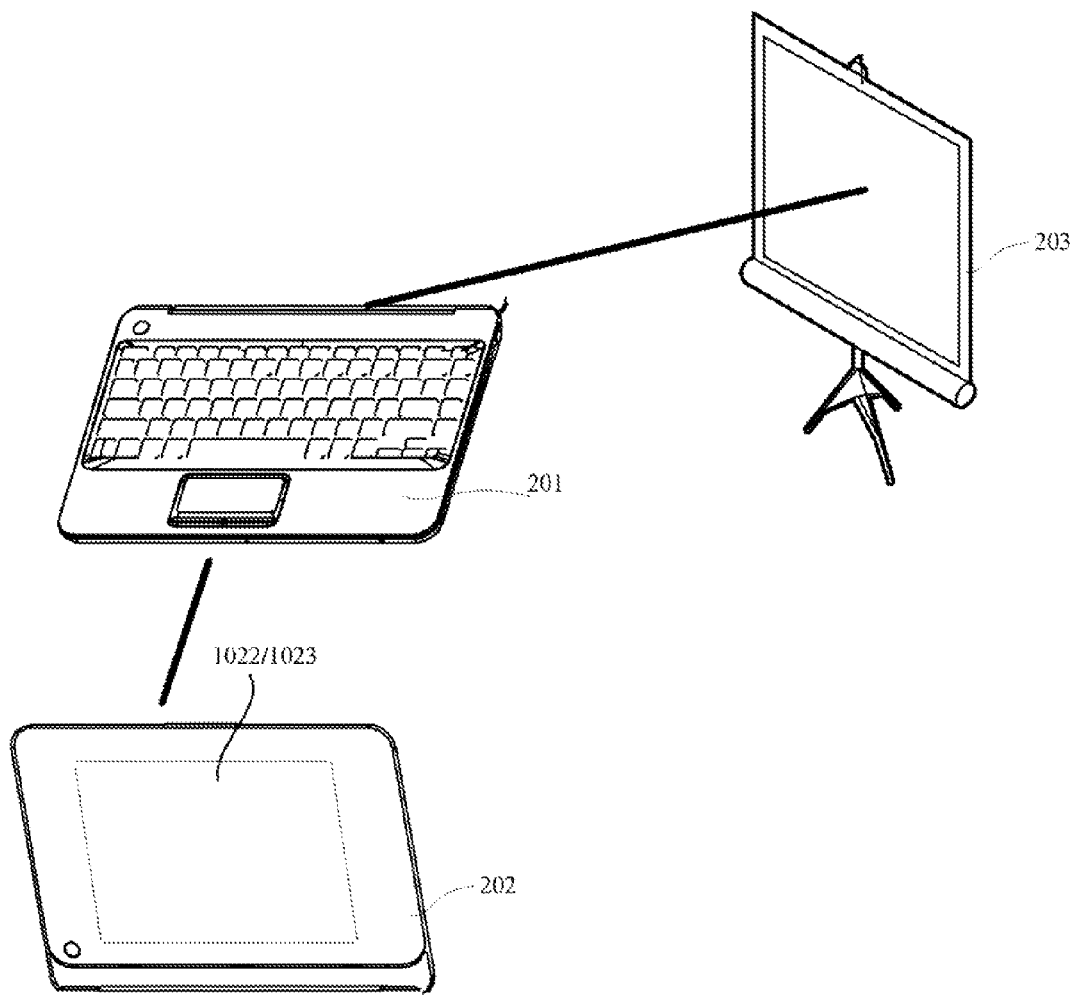
FIG. 4 is a structure diagram illustrating the application of the electronic device and method to large-screen Television (TV)

As shown in FIG. 4, various functions are realized by implementing different electric connection between the slate 202 and the base 201 plus other external devices. The first system 101 is the base 201 of the detachable computer, and the second system 102 is the slate 202 of the detachable computer.

The first connection state is wired connection, and the first interface 1012 and the third interface 1024 are plug-in interfaces complying with corresponding industrial standards.

The second connection state is wireless connection, which is implemented by at least one of Bluetooth, Wireless Local Area Network (WLAN), and Radio Frequency (RF).

In the detachable computer, generally,

The base 201 is of x86 architecture, and supports an OS with higher system requirements, such as Windows, MacOS, etc, to be running as the first OS 1011.

The slate 202 may be an ARM architecture system and comprises the second OS 1021, the input device 1022, and the display device 1023. Herein, the second OS 1021 may be an OS with lower system requirements, such as Linux OS; the input device 1022 is a touch screen or other kinds of sensor for receiving input operation from the user to implement interaction with a program; the display device 1023 is the display part of the touch screen, for displaying the running status of the program.

The detachable computer is in the first connection state before it is disassembled, the connecting relation between the slate 202 and the base 201 is identical to that for a non-detachable normal computer, which is in a original state; after being disassembled, the two parts may operate independently, and may also be in the second connection state, i.e., a cooperation state, as described in the embodiments of the present invention, and may conduct communication via wireless connection. Therefore, the slate 202 and the base 201 may choose various connection modes: a wired connection mode is adopted in the first connection state, plugs and sockets conforming to industrial standards or customized are employed between the slate 202 and the base 201 for data transmission and power supply, the data may be signals complying with the protocols of USB, PCIe, LVDS, VGA, eDisplayPort etc.

A wireless connection mode is adopted in the second connection state, when the slate 202 and the base 201 are disassembled to be in a cooperation state, wireless connection may be implemented as: Bluetooth, Wireless Local Area Network (WLAN) such as IEEE 802.11a/b/g etc, Radio Frequency (RF) such as 2.4 GHz RF and ZigBee, and Ultra Wide Band (UWB) wireless technology, for data transmission; and wireless charging schemes, such as microwave or Wireless Power, are adopted for supplying power to the slate 202 and/or the base 201.

The above technical solution is described in detail as:

The base 201, being an x86 system, supports various general purpose operating systems, has computing capability and graphic control capability, may run various games, and supports high definition video playback.

The slate 202 comprises the second OS 1021, the input device 1022, and the display device 1023 for implementing input control and data display. The slate 202 per se has a touch screen (Touchpanel) and sensor, which serves as the input device 1022 to receive input operations from the user, and to generate operating instructions. Herein, the sensor may be an acceleration sensor (G-Sensor), a pressure sensor, an acoustic sensor, a key sensor, a vibration feedback sensor, etc. The touch panel Touchpanel, per se, has also interaction function to receive input operations from the user. Also, the touch panel has a display function, which makes it be the display device 1023 at the same time.

Based on the technical solutions presented in the embodiments of the present invention, the function of the described detachable computer is extended, the second connection state is realized between the slate 202 and the base 201, and a third connection is implemented between the base 201 and an external display 203. Herein, the external display 203 generally refers to a device capable of realizing projecting function and playback function.

The second connection state is mostly by wireless connection, i.e., data transmission between the slate 202 and the base 201 may be implemented by Bluetooth or WiFi, at this time, the second connection state is realized by connecting the first system 101 (the base 201) to the fourth interface 1025 of the second system 102 (the slate 202) via the second interface 1013.

The third connection may be implemented by using wired connection, i.e., through plug-in interfaces complying with the corresponding industrial standards, such as HDMI interfaces etc.

With the above technical solution, after the computer is disassembled, the base 201, the slate 202, and the external display 203 are connected via different kinds of interfaces. When a program runs on the base 201, the program interface is displayed by the external display 203, the user's input is received by the input device 1022 of the base 201, the slate 202 may serve as a subsidiary display for the program running on the base 201, which displays some subsidiary information of the program, for example, icons for a plurality of game buttons displayed as hints for user control.

Furthermore, when the base 201 and the slate 202 are in the second connection state, the native keyboard and mouse on the base 201 may be disabled to prevent misoperation caused by user incaution.

Additional embodiments are provided hereinafter for implementing the technical solutions of the present invention in various application scenarios.

Figure 6:
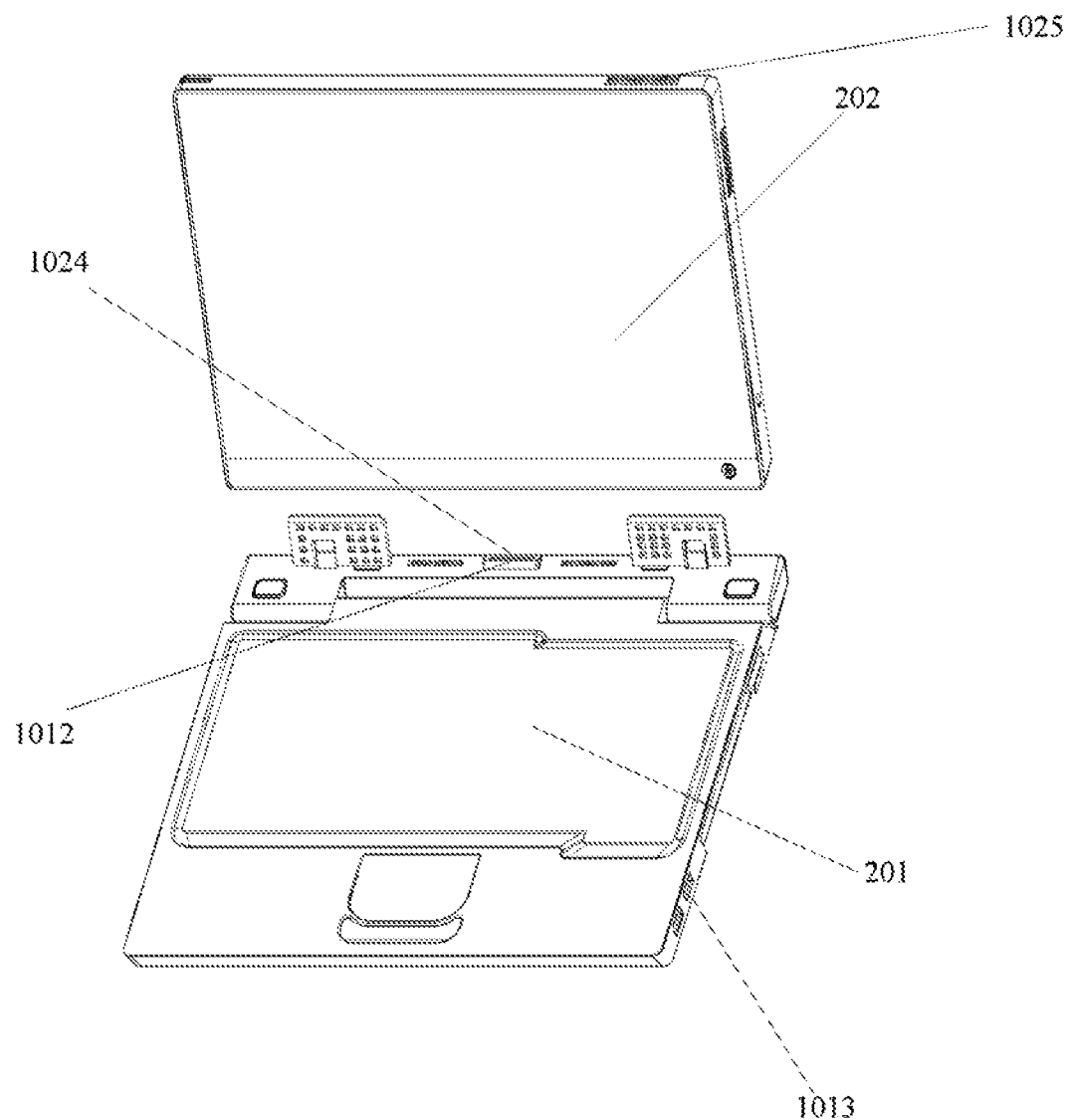
FIG. 6 is a structure diagram illustrating the cooperation of large-screen TV with the electronic device.

In the present embodiment, as shown in FIG. 6, a large-screen TV is employed in particular as the external display unit 203, the base 201 is connected to the large-screen TV, the user, holding the slate 202 in his hands, inputs by touching the input device 1022 of the slate 202, when a game is running on the base 201, the interface of the game is displayed on the large-screen TV. For example, the game includes standalone games, online games, and net games, as the base 201 has complete function of a general purpose computer, all kinds of games can be run. As such, experience of playing game on large-screen TV can be provided to the user.

Herein, slate 202 supports the display of corresponding touch rules, to teach the user with the touch operation, a sensor located on the slate 202 may also receive input. While in a office meeting scenario, the base 201 is connected with the projector, the user holds the slate 202 in his hands, a PowerPoint slide is played on the base 201, the presentation of the played slide appears on the slate 202, the user's input is received through the slate 202, the user controls the playback and interaction of the slide by the slate 202. For example, drawing a circle on an important content of the slide on the slate 202, the motion of drawing is captured by the slate 202 and inputted to the base 201, the base 201 responds to the motion of drawing by displaying it simultaneously on the projector.

Figure 5:
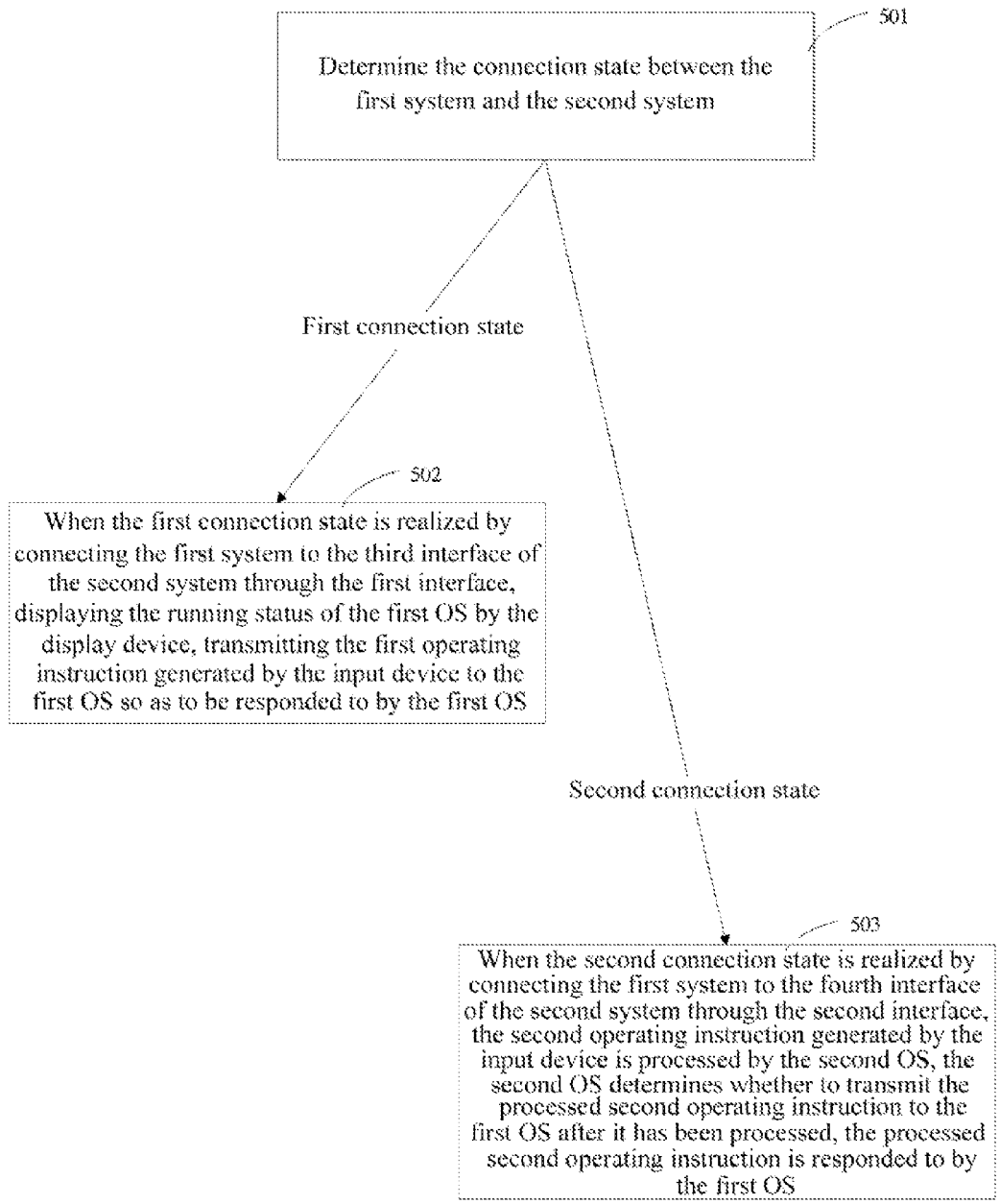
FIG. 5 is a flowchart diagram of the input method according to an embodiment of the present invention.

Moreover, according to an embodiment of the present invention, an input method applied to an electronic device is provided as shown in FIG. 5, the electronic device comprises a first system 101, which comprises a first hardware system, wherein a first Operation System (OS) 1011 runs on the first hardware system, and the first hardware system comprises a first interface and a second interface; and a second system 102, which comprises a second hardware system, an input device, and a display device, wherein a second OS 1021 runs on the second hardware system, the second hardware system comprises a third interface and a fourth interface, the first interface and the third interface support a first data transmission protocol, and the second interface and the fourth interface support a second data transmission protocol, There is a first connection state and a second connection state between the first system 101 and the second system 102: the method comprising:

Step 501, generating an operating instruction by the input device;

Step 502, in the first connection state, displaying the running status of the first OS 1011 by the display device, and transmitting a first operating instruction generated by the input device to the first OS 1011 so as to be responded to by the first OS 1011; and Step 503, in the second connection state, a second operating instruction generated by the input device is processed by the second OS 1021, transmitted to the first OS by the second OS 1021 after being processed, and responded to by the first OS 1011.

With the above technical solutions, since the two constituent parts of the detachable computer can be arbitrarily combined, the visual and interactive functions of the slate 202 and the computing capability of the base 201 are fully exploited through combination, enabling the user to take full advantage of the respective parts of the detachable computer.

The connection state between the first system and the second system is determined, comprising in particular: detecting a connection state between the first system 101 and the second system 102; and switching the authority of processing and/or responding to different operating instructions between the first system 101 and the second system 102 after the current connection state is determined.

The electronic device is a detachable computer, the first system 101 is a base 201 of the detachable computer, and the second system 102 is a slate 202 of the detachable computer. Subsequently, the process of implementing the above method comprises:

Step 601, detecting whether an interface of the slate 202 is connected with an interface of the base 201, and generating a first detection result therefrom.

Step 602, when the first detection result indicates the two interfaces are connected, transmitting a first notification instruction to the base 201 and the slate 202, respectively, indicating the base 201 is connected with the slate 202.

Herein, the electronic device is in a connected state when the base 201 is connected with the slate 202.

Step 603, the connection state between the base 201 and the slate 202 is detected, the received operating instruction is processed by the slate 202 respectively, according to the current connection state:

In the second connection state, the operating instruction is processed directly by the slate 202 and transmitted to the base 201, the operating instruction being the second operating instruction;

in the first connection state, the operating instruction is transmitted to the base 201 to be processed directly by the base 201, the operating instruction being the first operating instruction.

In the present embodiment, when a large-screen TV is employed in particular as the external display unit 203, the input operation is received through slate 202, and the interface running on the base 201 is displayed on the large-screen TV.

When a projector is employed in particular as the external display unit 203, the input operation is received through slate 202, and the interface running on the base 201 is projected by the projector.

The embodiments of the present invention have the following beneficial effects: since the two constituent parts of the detachable computer can be arbitrarily combined, the visual and interactive functions of the slate 202 and the computing capability of the base 201 are fully exploited though combination, therefore the functions of the slate 202 and the base 201 may be utilized in various scenarios to accomplish different tasks, such as playing movies and running games in conjunction with the large screen of the home theatre, and showing PowerPoint slides in conjunction with large screen in office, thereby enabling the user to take full advantage of the respective parts of the detachable computer.

It is to be noted that, the above embodiments are provided only for illustrating the technical solutions of the present invention but not for limiting, all parameter values may be adjusted according to actual situation without departing from the scope of the claims. It should be understood by those of ordinary skill in the art that modification or equivalent substitution can be made to the technical solutions of the present invention without departing from the spirit and scope of the claims, and shall fall within the scope of the claims of the present invention without exception.

What is claimed is:

1. An electronic device, comprising:
a first system having a first hardware system, a first Operation System (OS) configured to run on the first hardware system, and the first hardware system having a first interface and a second interface; and
a second system having a second hardware system, an input device, and a display device, a second OS configured to run on the second hardware system, the second hardware system having a third interface and a fourth interface, the first interface and the third interface support a first data transmission protocol, and the second interface and the fourth interface support a second data transmission protocol,
wherein the electronic device has two connection states:
when a first connection state is a state in which the first system is connected to the third interface of the second system through the first interface, the display device is configured to display a running status of the first OS, the input device is used for generating a first operating instruction, and the first OS is configured to respond to the first operating instruction, and
when a second connection state is a state in which the first system and the second system are disassembled and the first system is connected to the fourth interface of the second system through the second interface, the input device is used for generating a second operating instruction, the second operating instruction is processed by the second OS and transmitted to the first OS after being processed, and the processed second operating instruction is responded to by the first OS.

2. The electronic device of claim 1, wherein, the first hardware system or the second hardware system further comprising a connection detecting unit, configured for detecting a connection state between the first system and the second system, and generating a state detection result to be transmitted to the second system according to the current connection state.

3. The electronic device of claim 2, wherein, the second hardware system further comprising:
a second processing unit, configured for executing the second operating instruction delivered by the second OS;
a switching unit, connected to the third interface, the second processing unit, and the input device, which is configured for, after receiving the state detection result, analyzing the state detection result, and:
connecting the input device with the third interface, when the electronic device is in the first connection state; and
connecting the input device with the second processing unit, when the electronic device is in the second connection state.

4. The electronic device of claim 1, wherein, the first system is a base of a detachable computer, and the second system is a slate of the detachable computer; and the first connection state is a wired connection, and the first interface and the third interface are plug-in or contacting interfaces.

5. The electronic device of claim 1, wherein, the first system is a base of a detachable computer, and the second system is a slate of the detachable computer; and the second connection state is a wireless connection, which is implemented by one of Bluetooth, Wireless Local Area Network (WLAN), and Radio Frequency (RF).

6. The electronic device of claim 1, wherein, when the second connection state is realized by connecting the first system to the fourth interface of the second system through the second interface, the display device is configured to display the running status of the first OS or the running status of the second OS.

7. An input method of an electronic device, comprising:
a first system having a first hardware system, a first Operation System (OS) configured to run on the first hardware system, and the first hardware system having a first interface and a second interface; and
a second system having a second hardware system, an input device, and a display device, a second OS configured to run on the second hardware system, the second hardware system comprises a third interface and a fourth interface, the first interface and the third interface support a first data transmission protocol, and the second interface and the fourth interface support a second data transmission protocol,
the electronic device is configured to include a first connection state and a second connection state between the first system and the second system,
the first connection state is a state in which the first system is connected to the third interface of the second system through the first interface, and
the second connection state is a state in which the first system and the second system are disassembled and the first system is connected to the fourth interface of the second system through the second interface, wherein, the method comprising:
generating an operating instruction by the input device;
in the first connection state, displaying the running status of the first OS by the display device, and transmitting a first operating instruction generated by the input device to the first OS so as to be responded to by the first OS; and
in the second connection state, a second operating instruction generated by the input device is processed by the second OS, transmitted to the first OS by the second OS after being processed, and responded to by the first OS.

8. The method of claim 7, after the operating instruction is generated by the input device, further comprising detecting a connection state between the first system and the second system, and generating a state detection result to be transmitted to the second system according to the current connection state.

9. The method of claim 8, after the state detection result is received by the second system, further comprising:
analyzing the state detection result, and:
connecting the input device with the third interface, when the electronic device is in the first connection state; and
connecting the input device with the second processing unit, when the electronic device is in the second connection state.

10. The method of claim 8, before the operating instruction is generated by the input device, further comprising:
detecting whether an interface of the second system is connected with an interface of the first system, and generating a first detection result therefrom; and
when the first detection result indicates the two interfaces are connected, transmitting a first notification instruction to the first system and the second system, respectively, indicating to connecting the first system with the second system,
wherein the electronic device is in a connected state when the first system is connected with the second system.

* * * * *